United States Patent
Zhang

(10) Patent No.: US 9,261,724 B2
(45) Date of Patent: Feb. 16, 2016

(54) JOINTED CURVED LIQUID CRYSTAL DISPLAY DEVICE

(71) Applicant: Shenzhen China Star Optoelectronics Technology Co., Ltd., Shenzhen, Guangdong (CN)

(72) Inventor: Yanxue Zhang, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 68 days.

(21) Appl. No.: 14/360,608

(22) PCT Filed: Apr. 11, 2014

(86) PCT No.: PCT/CN2014/075160
§ 371 (c)(1),
(2) Date: May 23, 2014

(87) PCT Pub. No.: WO2015/143742
PCT Pub. Date: Oct. 1, 2015

(65) Prior Publication Data
US 2015/0293389 A1 Oct. 15, 2015

(30) Foreign Application Priority Data
Mar. 27, 2014 (CN) .......................... 2014 1 0120953

(51) Int. Cl.
*G02F 1/1333* (2006.01)
*G06F 1/16* (2006.01)

(52) U.S. Cl.
CPC ...... *G02F 1/13336* (2013.01); *G02F 1/133308* (2013.01); *G06F 1/1641* (2013.01)

(58) Field of Classification Search
CPC ....................... G02F 1/13336; G02F 1/133308
See application file for complete search history.

(56) References Cited

U.S. PATENT DOCUMENTS

| 5,675,687 | A  | * | 10/1997 | Wood ..................... G06F 1/1616 385/115 |
| 9,103,524 | B2 | * | 8/2015  | Geng ..................... G02B 5/045 |
| 2006/0238440 | A1 | * | 10/2006 | Kim ................... G02F 1/133526 345/1.1 |
| 2010/0277665 | A1 | * | 11/2010 | Kuo ..................... G02F 1/13336 349/58 |

FOREIGN PATENT DOCUMENTS

JP          1998050646  A     2/1998

* cited by examiner

*Primary Examiner* — James Dudek
(74) *Attorney, Agent, or Firm* — Andrew C. Cheng

(57) ABSTRACT

The present invention provides a jointed curved liquid crystal display device, which includes: at least two liquid crystal display units. The at least two liquid crystal display units includes: a first liquid crystal display unit (2) and a second liquid crystal display unit (4) connected to one edge of the first liquid crystal display unit (2) to be rotatable about one axis. The first and second liquid crystal display units (2, 4) receive a first cushion section (8) mounted therebetween. The axis is arranged to be opposite to the first cushion section (8). The at least two liquid crystal display units further includes a third liquid crystal display unit (6) connected to an opposite edge of the first liquid crystal display unit (2) to be rotatable about another axis. The first and third liquid crystal display units (2, 6) receive a second cushion section (10) mounted therebetween. Said another axis is arranged to be opposite to the second cushion section (10). The jointed curved liquid crystal display device can display one or multiple images according to the needs of users and allows for adjustment of curve angle thereof as desired.

16 Claims, 6 Drawing Sheets

JOINTED CURVED LIQUID CRYSTAL DISPLAY DEVICE

BACKGROUND OF THE INVENTION

1. Field of the Invention

The present invention relates to the field of liquid crystal displaying, and in particular to a jointed curved liquid crystal display device.

2. The Related Arts

Liquid crystal displays (LCDs) have a variety of advantages, such as thin device body, low power consumption, and being free of radiation, and are thus of wide applications, such as mobile phones, personal digital assistants (PDAs), digital cameras, computer monitors, and notebook computer screens.

A liquid crystal display device generally comprises an enclosure, a liquid crystal panel arranged in the enclosure, and a backlight module mounted in the enclosure. Recently, major manufacturers have marketed curved liquid crystal display devices one after another. Generally speaking, the curved liquid crystal display devices allow for the best viewing effect from edge to edge, while a regular liquid crystal display device has poor capability of displaying at edges of a screen. The curved liquid crystal display devices has a screen that has a curved design showing a surrounding configuration toward a viewer so as to provide a wide full-view image, allowing for the same visual enjoyment at both the central portion and the circumferential portion of the screen and also reducing distortion of off-axis viewing for viewing at a short distance. Further, the curved liquid crystal display device allows a viewer's viewing distance to be extended, achieving better experience of viewing. Thus, compared to the regular liquid crystal display devices, the curved liquid crystal display devices have advantages, including: (1) brand differentiating, (2) wider viewable angle, and (3) reducing distortion for short distance viewing.

However, the curve of the conventional curved liquid crystal display device is generally fixed and is not adjustable, imposing limitations to the view angles and complicating the structure and thus requiring a relatively high cost.

SUMMARY OF THE INVENTION

An object of the present invention is to provide a jointed curved liquid crystal display device, which allows for adjustment of the curve thereof and has a simple structure and thus a low cost.

To achieve the above object, the present invention provides a jointed curved liquid crystal display device, which comprises at least two liquid crystal display units. The at least two liquid crystal display units comprises a first liquid crystal display unit and a second liquid crystal display unit that is connected to one edge of the first liquid crystal display unit to be rotatable about one axis. The first and second liquid crystal display units receive a first cushion section mounted therebetween. Said one axis is arranged to be opposite to the first cushion section.

The at least two liquid crystal display units further comprise a third liquid crystal display unit that is connected to an opposite edge of the first liquid crystal display unit to be rotatable about another axis. The first and third liquid crystal display units receive a second cushion section mounted therebetween. Said another axis is arranged to be opposite to the second cushion section.

The first liquid crystal display unit comprises a pair of first lugs. Each of the first lugs comprises a first hole formed therein. The second liquid crystal display unit comprises a pair of second lugs corresponding to the first lugs respectively. Each of the second lugs comprises a second hole formed therein. The first lugs are arranged to respectively mate and abut the second lugs. The first and second holes of the mated first and second lugs are in alignment with each other. A first rotation axle is received in the aligned first and second holes so that the second liquid crystal display unit is rotatable about the first rotation axle with respect to the first liquid crystal display unit.

The third liquid crystal display unit comprises a pair of third lugs. Each of the third lugs comprises a third hole formed therein. The first liquid crystal display unit further comprises a pair of fourth lugs corresponding to the third lugs respectively. Each of the fourth lugs comprises a fourth hole formed therein. The third lugs are arranged to respectively mate and abut the fourth lugs. The third and fourth holes of the mated third and fourth lugs are in alignment with each other. A second rotation axle is received in the aligned third and fourth holes so that the third liquid crystal display unit is rotatable about the second rotation axle with respect to the first liquid crystal display unit.

The first cushion section is made of synthetic paper and is set in a folded configuration.

The first cushion section has opposite sides respectively and adhesively bonded to the first and second liquid crystal display units at edges thereof.

The first liquid crystal display unit comprises a first driver device mounted thereto. The first driver device has an end positioned against the second liquid crystal display unit.

The first driver device is mounted to the first liquid crystal display unit at a location close to the second liquid crystal display unit. The first driver device comprises a first servo motor, a first cam coupled to the first servo motor, and a first spring engaging the first cam. The first spring has an end distant from the first cam and positioned against the second liquid crystal display unit.

The first liquid crystal display unit comprises a first outer frame and the second liquid crystal display unit comprises a second outer frame. The first and second outer frames are integrally formed together and rotatable about connected edges therebetween.

The second cushion section is made of synthetic paper and is set in a folded configuration and has opposite side edges respectively and adhesively bonded to the first and third liquid crystal display units at edges thereof. The first liquid crystal display unit comprises a second driver device mounted thereto. The second driver device has an end positioned against the third liquid crystal display unit. The second driver device is mounted to the first liquid crystal display unit at a location close to the third liquid crystal display unit. The second driver device comprises a second servo motor, a second cam coupled to the second servo motor, and a second spring engaging the second cam. The second spring has an end distant from the second cam and positioned against the third liquid crystal display unit. The first liquid crystal display unit comprises a first outer frame. The second liquid crystal display unit comprises a second outer frame. The third liquid crystal display unit comprises a third outer frame. The first, second, and third outer frames are integrally formed together and rotatable about connected edges therebetween.

The present invention also provides a jointed curved liquid crystal display device, which comprises at least two liquid crystal display units, the at least two liquid crystal display units comprising a first liquid crystal display unit and a second liquid crystal display unit that is connected to one edge of the first liquid crystal display unit to be rotatable about one axis, the first and second liquid crystal display units receiving a first cushion section mounted therebetween, said one axis being arranged to be opposite to the first cushion section;

wherein the at least two liquid crystal display units further comprise a third liquid crystal display unit that is connected to an opposite edge of the first liquid crystal display unit to be rotatable about another axis, the first and third liquid crystal display units receiving a second cushion section mounted therebetween, said another axis being arranged to be opposite to the second cushion section;

wherein the first liquid crystal display unit comprises a pair of first lugs, each of the first lugs comprising a first hole formed therein, the second liquid crystal display unit comprising a pair of second lugs corresponding to the first lugs respectively, each of the second lugs comprising a second hole formed therein, the first lugs being arranged to respectively mate and abut the second lugs, the first and second holes of the mated first and second lugs being in alignment with each other, a first rotation axle being received in the aligned first and second holes so that the second liquid crystal display unit is rotatable about the first rotation axle with respect to the first liquid crystal display unit;

wherein the third liquid crystal display unit comprises a pair of third lugs, each of the third lugs comprising a third hole formed therein, the first liquid crystal display unit further comprising a pair of fourth lugs corresponding to the third lugs respectively, each of the fourth lugs comprising a fourth hole formed therein, the third lugs being arranged to respectively mate and abut the fourth lugs, the third and fourth holes of the mated third and fourth lugs being in alignment with each other, a second rotation axle being received in the aligned third and fourth holes so that the third liquid crystal display unit is rotatable about the second rotation axle with respect to the first liquid crystal display unit;

wherein the first cushion section is made of synthetic paper and is set in a folded configuration; and wherein the first cushion section has opposite sides respectively and adhesively bonded to the first and second liquid crystal display units at edges thereof.

The first liquid crystal display unit comprises a first driver device mounted thereto. The first driver device has an end positioned against the second liquid crystal display unit.

The first driver device is mounted to the first liquid crystal display unit at a location close to the second liquid crystal display unit. The first driver device comprises a first servo motor, a first cam coupled to the first servo motor, and a first spring engaging the first cam. The first spring has an end distant from the first cam and positioned against the second liquid crystal display unit.

The first liquid crystal display unit comprises a first outer frame and the second liquid crystal display unit comprises a second outer frame. The first and second outer frames are integrally formed together and rotatable about connected edges therebetween.

The second cushion section is made of synthetic paper and is set in a folded configuration and has opposite side edges respectively and adhesively bonded to the first and third liquid crystal display units at edges thereof. The first liquid crystal display unit comprises a second driver device mounted thereto. The second driver device has an end positioned against the third liquid crystal display unit. The second driver device is mounted to the first liquid crystal display unit at a location close to the third liquid crystal display unit. The second driver device comprises a second servo motor, a second cam coupled to the second servo motor, and a second spring engaging the second cam. The second spring has an end distant from the second cam and positioned against the third liquid crystal display unit. The first liquid crystal display unit comprises a first outer frame. The second liquid crystal display unit comprises a second outer frame. The third liquid crystal display unit comprises a third outer frame. The first, second, and third outer frames are integrally formed together and rotatable about connected edges therebetween.

The efficacy of the present invention is that the present invention provides a jointed curved liquid crystal display device, which makes use of rotatable jointing to divide a liquid crystal display device into a structure composed of multiple segmented sub-zones, whereby in displaying images, the sub-zones can display the same image or display multiple different images, or a curving angle can be adjusted as desired by a user, or a liquid crystal display device can be converted from a curved structure to a flat panel structure so as to satisfy different needs of different users and avoids influence caused by view angles and also avoids the necessity of purchasing many liquid crystal display devices for watching different programs to thus reduce the expense and also enhance the experience of the consumers as program subscribers. Further, the arrangement of the first and second cushion sections provides an effect of cushioning and also beautifying the outside appearance.

For better understanding of the features and technical contents of the present invention, reference will be made to the following detailed description of the present invention and the attached drawings. However, the drawings are provided for the purposes of reference and illustration and are not intended to impose limitations to the present invention.

BRIEF DESCRIPTION OF THE DRAWINGS

The technical solution, as well as other beneficial advantages, of the present invention will be apparent from the following detailed description of embodiments of the present invention, with reference to the attached drawing. In the drawing.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
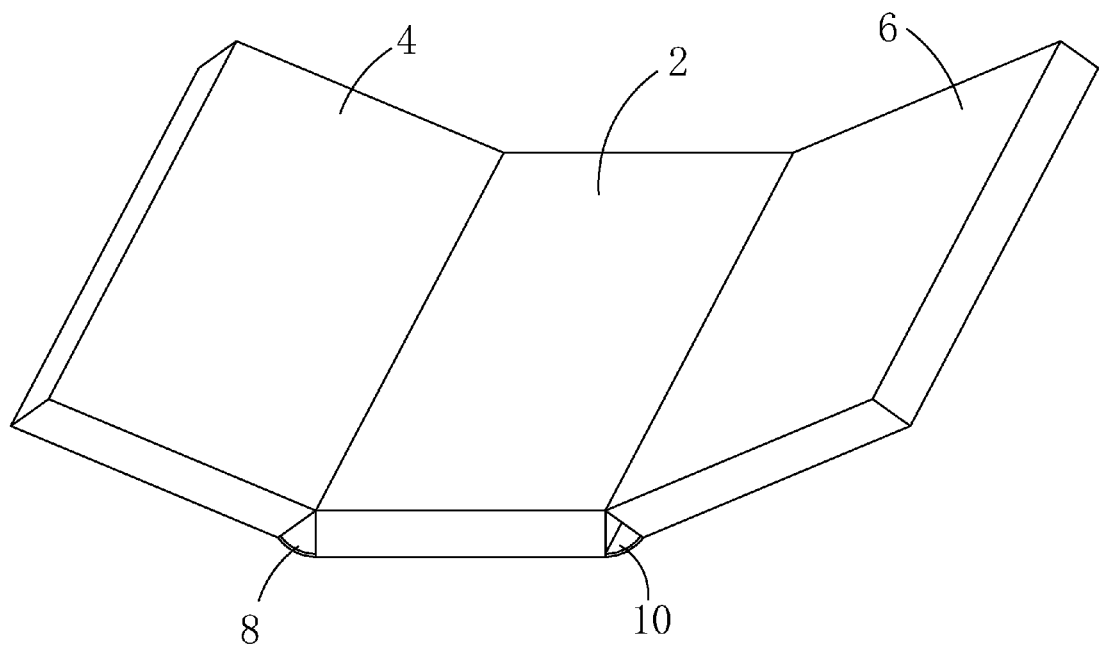
FIG. 1 is a perspective view showing a jointed curved liquid crystal display device according to the present invention.

Referring to FIG. 1, the present invention provides a jointed curved liquid crystal display device, which comprises: a first liquid crystal display unit 2, a second liquid crystal display unit 4 that is connected to one edge of the first liquid crystal display unit 2 to be rotatable about one axis, and a third liquid crystal display unit 6 that is connected to an opposite edge of the first liquid crystal display unit 2 to be rotatable about another axis. The first and second liquid crystal display units 2, 4 receive a first cushion section 8 mounted therebetween and said one axis is arranged to be opposite to the first cushion section 8. The first and third liquid crystal display units 2, 6 receive a cushion section 10 mounted therebetween and said another axis is arranged to be opposite to the second cushion section 10. To display images, according to the need for watching, the first, second, and third liquid crystal display units 2, 4, 6 can be operated to display the same image or different images. The curve can be adjusted in respect of the angle thereof to suit the need of the user, or the entire liquid crystal display device can be adjusted to change from a curved structure to a flat panel structure.

Figure 2:
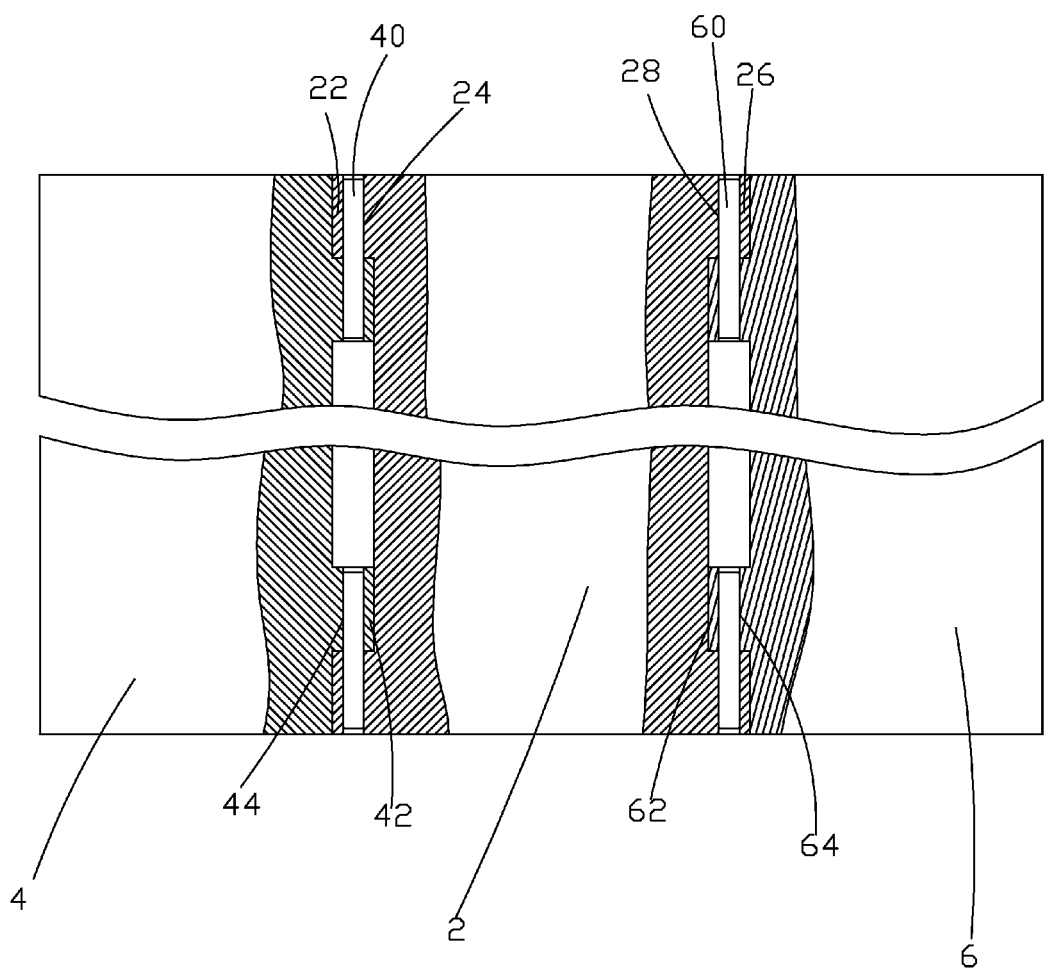
FIG. 2 is a front cross-sectional view of the jointed curved liquid crystal display device according to the present invention.
Figure 3:
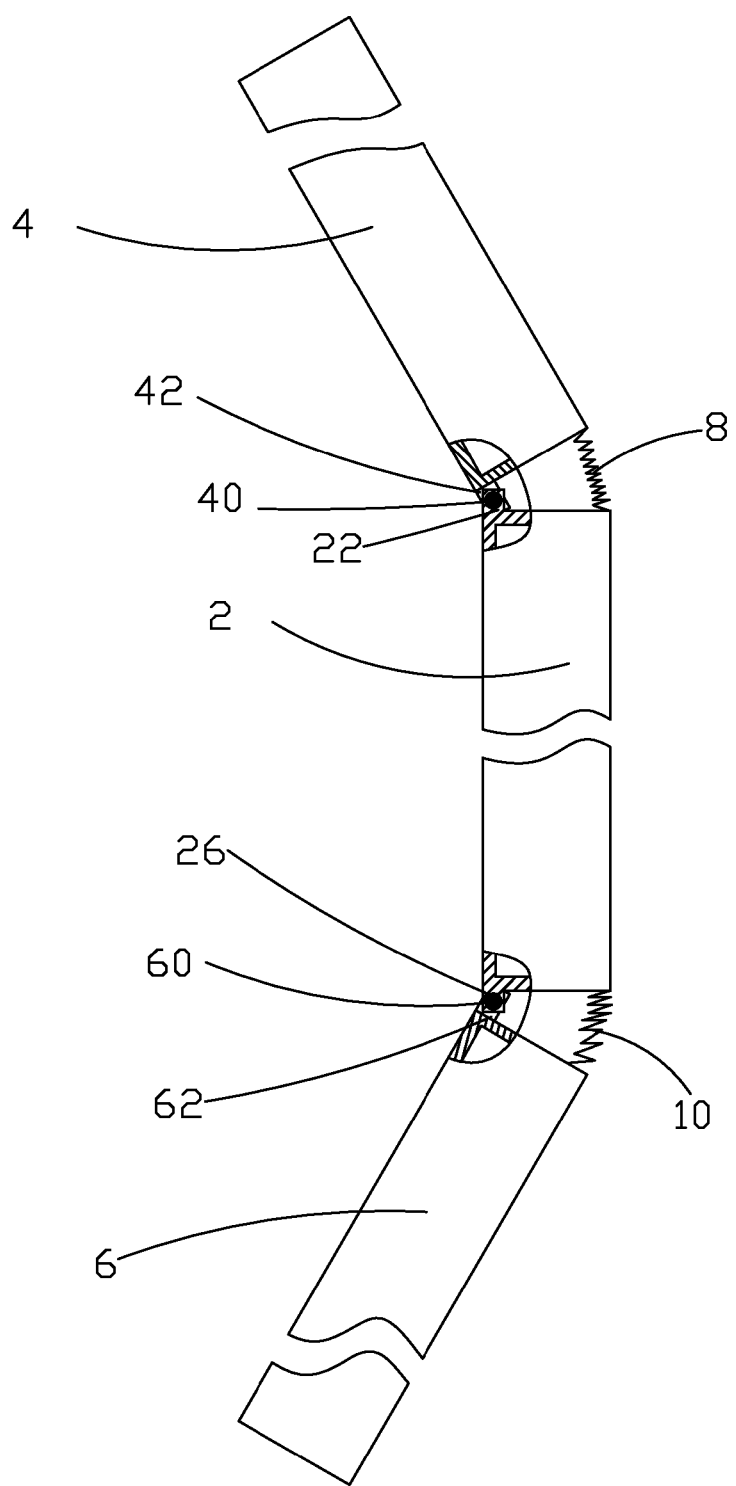
FIG. 3 is a top plan view of the jointed curved liquid crystal display device according to the present invention.

Specifically, referring to FIGS. 2 and 3, the first liquid crystal display unit 2 comprises a pair of first lugs 22 and each of the first lugs 22 comprises a first hole 24 formed therein. The second liquid crystal display unit 4 comprises a pair of second lugs 42 corresponding to the first lugs 22 respectively. Each of the second lugs 42 comprises a second hole 44 formed therein. The third liquid crystal display unit 6 comprises a pair of third lugs 62 and each of the third lugs 62 comprises a third hole 64 formed therein. The first liquid crystal display unit 2 further comprises a pair of fourth lugs 26 corresponding to the third lugs 62 respectively. Each of the fourth lugs 26 comprises a fourth hole 28 formed therein. The first lugs are arranged to respectively mate and abut the second lugs 42 in such a way that the first and second holes 24, 44 of the mated first and second lugs 22, 42 are in alignment with each other. A first rotation axle 40 is received in the aligned first and second holes 24, 44 so that the second liquid crystal display unit 4 is rotatable about the first rotation axle 40 with respect to the first liquid crystal display unit 2. The third lugs 62 are arranged to respectively mate and abut the fourth lugs 26 in such a way that the third and fourth holes 64, 28 of the mated third and fourth lugs 62, 26 are in alignment with each other. A second rotation axle 60 is received in the aligned third and fourth holes 64, 28 so that the third liquid crystal display unit 6 is rotatable about the second rotation axle 60 with respect to the first liquid crystal display unit 2.

The first and second cushion sections 8, 10 are both made of un-tearable synthetic paper having a thickness of 0.2 mm. The first cushion section 8 is set in a folded configuration having opposite sides respectively and adhesively bonded to the first and second liquid crystal display units 2, 4 at the edges thereof that are distant from the first rotation axle 40. The second cushion section 10 is set in a folded configuration having opposite sides respectively and adhesively bonded to the first and third liquid crystal display units 2, 6 at the edges thereof that are distant from the second rotation axle 60.

When the first, second, and third liquid crystal display units 2, 4, 6 are moved with respect to each other to open and form a curved liquid crystal display device, the first and second cushion sections 8, 10 are in an expanded condition so as to respectively cover a gap between the first and second liquid crystal display units 2, 4 and a gap between the first and third liquid crystal display units 2, 6 to provide an effect of protection and also to beautify the liquid crystal display device in the entirety thereof. When the first, second, and third liquid crystal display units 2, 4, 6 are moved with respect to each other to close and form a flat panel liquid crystal display device, the first and second cushion sections 8, 10 are in a collapsed condition and are respectively interposed between the first and second liquid crystal display units 2, 4 and between the first and third liquid crystal display units 2, 6 to prevent direct contact between two liquid crystal display units, achieving a cushioning effect.

Figure 4:
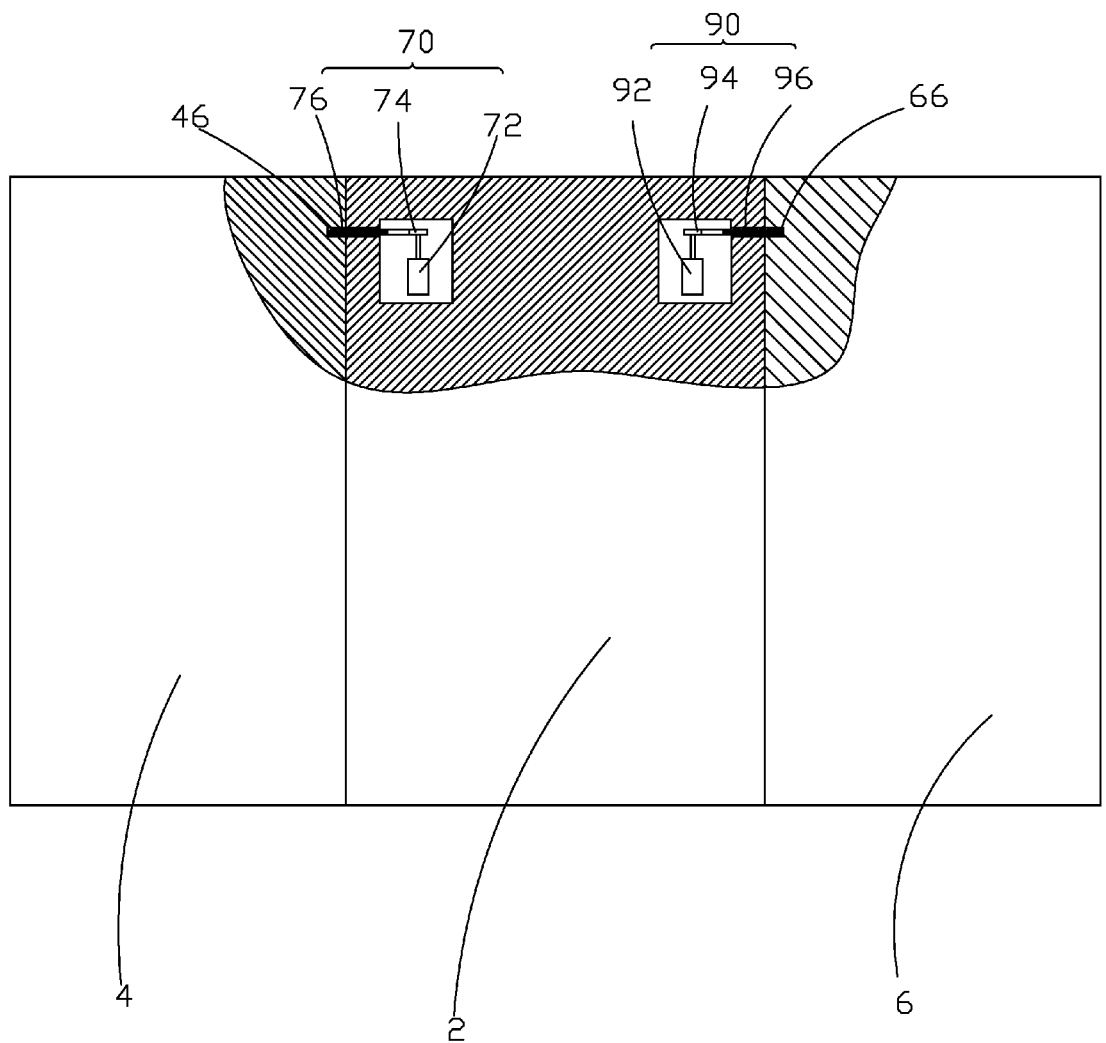
FIG. 4 is a front cross-sectional view of the jointed curved liquid crystal display device according to the present invention.
Figure 5:
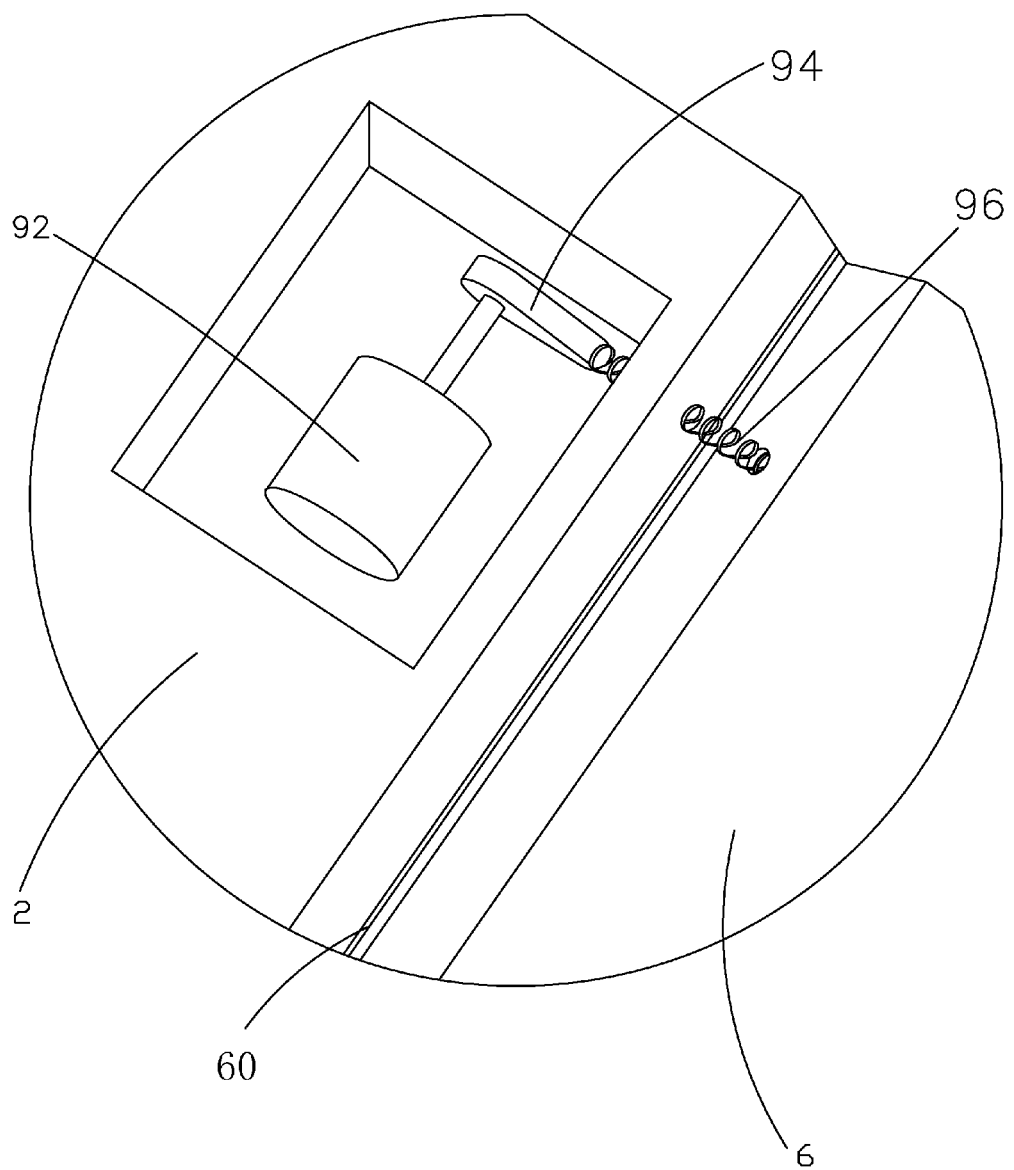
FIG. 5 is a perspective view showing a portion of the jointed curved liquid crystal display device according to the present invention.

Further, referring to FIGS. 4 and 5, the second and third liquid crystal display units 4, 6 use a first driver device 70 and a second driver device 90 that are mounted to the first liquid crystal display unit 2 to achieve rotations thereof with respect to the first liquid crystal display unit 2.

The first driver device 70 is mounted to the first liquid crystal display unit 2 at a location close to the second liquid crystal display unit 4 and comprises a first servo motor 72, a first cam 74 coupled to the first servo motor 72, and a first spring 76 engaging the first cam 74. The first spring 76 has an end distant from the first cam 74 and positioned against the second liquid crystal display unit 4. In the instant embodiment, the second liquid crystal display unit 4 comprises a first recess 46 formed therein and corresponding in position to the first spring 76. The first spring 76 extends into the first recess 46 and abuts a bottom of the first recess 46.

The second driver device 90 is mounted to the first liquid crystal display unit 2 at a location close to the third liquid crystal display unit 6 and comprises a second servo motor 92, a second cam 94 coupled to the second servo motor 92, and a second spring 96 engaging the second cam 94. The second spring 96 has an end distant from the second cam 94 and positioned against the third liquid crystal display unit 6. In the instant embodiment, the third liquid crystal display unit 6 comprises a second recess 66 formed therein and corresponding in position to the second spring 96. The second spring 96 extends into the second recess 66 and abuts a bottom of the second recess 66.

When it is desired to set the first, second, and third liquid crystal display units 2, 4, 6 to form different angles therebetween, the first and second servo motors 72, 92 drive the first and second cams 74, 94 to rotate toward top dead points so that the first and second cams 74, 94 compress the first and second springs 76, 96 and the first and second springs 76, 96 drive the second and third liquid crystal display units 4, 6 to rotate about the first and second rotation axles 40, 60 thereby achieving relative rotations of the first, second, and third liquid crystal display units 2, 4, 6 with respect to each other. The operation of the first and second servo motors 72, 92 can be controlled with a remote control (not shown) so that remotely controlled operations can be achieved, whereby by controlling the angular displacements of the first and second servo motors 72, 92 to be different, the contact locations of the first and second cams 74, 94 with the first and second springs 76, 96 are made different so that the compressions of the first and second springs 76, 96 are different, helping achieve adjustment of relative angles among the first, second, and third liquid crystal display units 2, 4, 6. Further, adjustment through manual operation can also be available to make the operation easy and user friendly.

Figure 6:
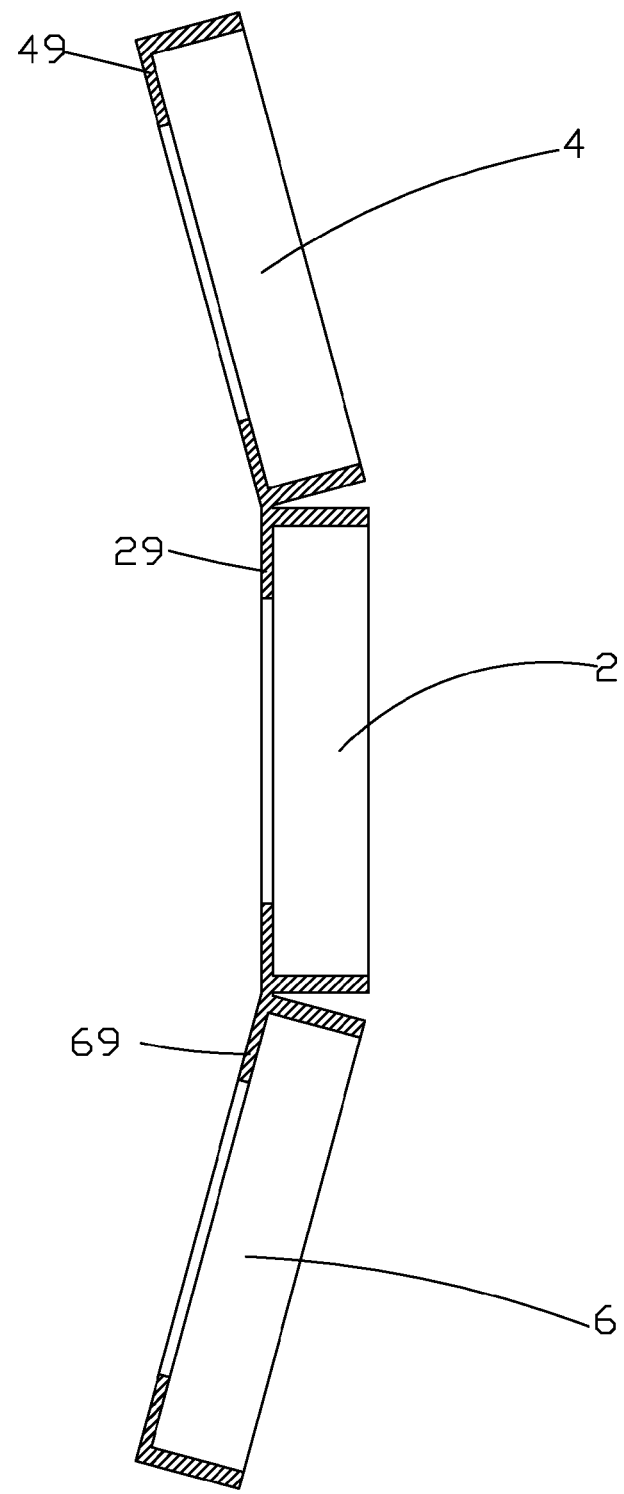
FIG. 6 is a cross-sectional view showing a jointed curved liquid crystal display device according to another embodiment of the present invention.

Referring to FIG. 6, a cross-sectional view is given to show another embodiment of the present invention, the first liquid crystal display unit 2 comprises a first outer frame 29; the second liquid crystal display unit 4 comprises a second outer frame 49; and the third liquid crystal display unit 6 comprises a third outer frame 69. In the instant embodiment, the first, second, and third outer frames 29, 49, 69 are integrally formed together, preferably through injection molding of rubber materials, and are allowed to rotate about connected edges therebetween.

In summary, the present invention provides a jointed curved liquid crystal display device, which makes use of rotatable jointing to divide a liquid crystal display device into a structure composed of multiple segmented sub-zones, whereby in displaying images, the sub-zones can display the same image or display multiple different images, or a curving angle can be adjusted as desired by a user, or a liquid crystal display device can be converted from a curved structure to a flat panel structure so as to satisfy different needs of different users and avoids influence caused by view angles and also avoids the necessity of purchasing many liquid crystal display devices for watching different programs to thus reduce the expense and also enhance the experience of the consumers as program subscribers. Further, the arrangement of the first and second cushion sections provides an effect of cushioning and also beautifying the outside appearance.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A jointed curved liquid crystal display device, comprising at least two liquid crystal display units, the at least two liquid crystal display units comprising a first liquid crystal display unit and a second liquid crystal display unit that is connected to one edge of the first liquid crystal display unit to be rotatable about one axis, the first and second liquid crystal display units receiving a first cushion section mounted therebetween, said one axis being arranged to be opposite to the first cushion section;

wherein the first liquid crystal display unit comprises a first driver device mounted thereto, the first driver device having an end positioned against the second liquid crystal display unit; and wherein the first driver device is mounted to the first liquid crystal display unit at a location close to the second liquid crystal display unit, the first driver device comprising a first servo motor, a first cam coupled to the first servo motor, and a first spring first spring having an end distant from the first cam and positioned against the second liquid crystal display unit.

2. The jointed curved liquid crystal display device as claimed in claim 1, wherein the at least two liquid crystal display units further comprise a third liquid crystal display unit that is connected to an opposite edge of the first liquid crystal display unit to be rotatable about another axis, the first and third liquid crystal display units receiving a second cushion section mounted therebetween, said another axis being arranged to be opposite to the second cushion section.

3. The jointed curved liquid crystal display device as claimed in claim 1, wherein the first liquid crystal display unit comprises a pair of first lugs, each of the first lugs comprising a first hole formed therein, the second liquid crystal display unit comprising a pair of second lugs corresponding to the first lugs respectively, each of the second lugs comprising a second hole formed therein, the first lugs being arranged to respectively mate and abut the second lugs, the first and second holes of the mated first and second lugs being in alignment with each other, a first rotation axle being received in the aligned first and second holes so that the second liquid crystal display unit is rotatable about the first rotation axle with respect to the first liquid crystal display unit.

4. The jointed curved liquid crystal display device as claimed in claim 2, wherein the third liquid crystal display unit comprises a pair of third lugs, each of the third lugs comprising a third hole formed therein, the first liquid crystal display unit further comprising a pair of fourth lugs corresponding to the third lugs respectively, each of the fourth lugs comprising a fourth hole formed therein, the third lugs being arranged to respectively mate and abut the fourth lugs, the third and fourth holes of the mated third and fourth lugs being in alignment with each other, a second rotation axle being received in the aligned third and fourth holes so that the third liquid crystal display unit is rotatable about the second rotation axle with respect to the first liquid crystal display unit.

5. The jointed curved liquid crystal display device as claimed in claim 1, wherein the first cushion section is made of synthetic paper and is set in a folded configuration.

6. The jointed curved liquid crystal display device as claimed in claim 5, wherein the first cushion section has opposite sides respectively and adhesively bonded to the first and second liquid crystal display units at edges thereof.

7. The jointed curved liquid crystal display device as claimed in claim 1, wherein the first liquid crystal display unit comprises a first outer frame and the second liquid crystal display unit comprises a second outer frame, the first and second outer frames being integrally formed together and rotatable about connected edges therebetween.

8. The jointed curved liquid crystal display device as claimed in claim 2, wherein the second cushion section is made of synthetic paper and is set in a folded configuration and has opposite side edges respectively and adhesively bonded to the first and third liquid crystal display units at edges thereof, the first liquid crystal display unit comprising a second driver device mounted thereto, the second driver device having an end positioned against the third liquid crystal display unit, the second driver device being mounted to the first liquid crystal display unit at a location close to the third liquid crystal display unit, the second driver device comprising a second servo motor, a second cam coupled to the second servo motor, and a second spring engaging the second cam, the second spring having an end distant from the second cam and positioned against the third liquid crystal display unit, the first liquid crystal display unit comprising a first outer frame, the second liquid crystal display unit comprising a second outer frame, the third liquid crystal display unit comprising a third outer frame, the first, second, and third outer frames being integrally formed together and rotatable about connected edges therebetween.

9. A jointed curved liquid crystal display device, comprising at least two liquid crystal display units, the at least two liquid crystal display units comprising a first liquid crystal display unit and a second liquid crystal display unit that is connected to one edge of the first liquid crystal display unit to be rotatable about one axis, the first and second liquid crystal display units receiving a first cushion section mounted therebetween, said one axis being arranged to be opposite to the first cushion section;

wherein the at least two liquid crystal display units further comprise a third liquid crystal display unit that is connected to an opposite edge of the first liquid crystal display unit to be rotatable about another axis, the first and third liquid crystal display units receiving a second cushion section mounted therebetween, said another axis being arranged to be opposite to the second cushion section;

wherein the first liquid crystal display unit comprises a pair of first lugs, each of the first lugs comprising a first hole formed therein, the second liquid crystal display unit comprising a pair of second lugs corresponding to the first lugs respectively, each of the second lugs comprising a second hole formed therein, the first lugs being arranged to respectively mate and abut the second lugs, the first and second holes of the mated first and second lugs being in alignment with each other, a first rotation axle being received in the aligned first and second holes so that the second liquid crystal display unit is rotatable about the first rotation axle with respect to the first liquid crystal display unit;

wherein the third liquid crystal display unit comprises a pair of third lugs, each of the third lugs comprising a third hole formed therein, the first liquid crystal display unit further comprising a pair of fourth lugs corresponding to the third lugs respectively, each of the fourth lugs comprising a fourth hole formed therein, the third lugs being arranged to respectively mate and abut the fourth lugs, the third and fourth holes of the mated third and fourth lugs being in alignment with each other, a second rotation axle being received in the aligned third and fourth holes so that the third liquid crystal display unit is rotatable about the second rotation axle with respect to the first liquid crystal display unit;

wherein the first cushion section is made of synthetic paper and is set in a folded configuration;

wherein the first cushion section has opposite sides respectively and adhesively bonded to the first and second liquid crystal display units at edges thereof;

wherein the first liquid crystal display unit comprises a first driver device mounted thereto, the first driver device having an end positioned against the second liquid crystal display unit; and wherein the first driver device is mounted to the first liquid crystal display unit at a location close to the second liquid crystal display unit, the first driver device comprising a first servo motor, a first cam coupled to the first servo motor, and a first spring engaging the first cam, the first spring having an end distant from the first cam and positioned against the second liquid crystal display unit.

10. The jointed curved liquid crystal display device as claimed in claim 9, wherein the first liquid crystal display unit comprises a first outer frame and the second liquid crystal display unit comprises a second outer frame, the first and second outer frames being integrally formed together and rotatable about connected edges therebetween.

11. The jointed curved liquid crystal display device as claimed in claim 9, wherein the second cushion section is made of synthetic paper and is set in a folded configuration and has opposite side edges respectively and adhesively bonded to the first and third liquid crystal display units at edges thereof, the first liquid crystal display unit comprising a second driver device mounted thereto, the second driver device having an end positioned against the third liquid crystal display unit, the second driver device being mounted to the first liquid crystal display unit at a location close to the third liquid crystal display unit, the second driver device comprising a second servo motor, a second cam coupled to the second servo motor, and a second spring engaging the second cam, the second spring having an end distant from the second cam and positioned against the third liquid crystal display unit, the first liquid crystal display unit comprising a first outer frame, the second liquid crystal display unit comprising a second outer frame, the third liquid crystal display unit comprising a third outer frame, the first, second, and third outer frames being integrally formed together and rotatable about connected edges therebetween.

12. A jointed curved liquid crystal display device, comprising at least two liquid crystal display units, the at least two liquid crystal display units comprising a first liquid crystal display unit and a second liquid crystal display unit that is connected to one edge of the first liquid crystal display unit to be rotatable about one axis, the first and second liquid crystal display units receiving a first cushion section mounted therebetween said one axis being arranged to be opposite to the first cushion section;

wherein the at least two liquid crystal display units further comprise a third liquid crystal display unit that is connected to an opposite edge of the first liquid crystal display unit to be rotatable about another axis, the first and third liquid crystal display units receiving a second cushion section mounted therebetween, said another axis being arranged to be opposite to the second cushion section; and wherein the second cushion section is made of synthetic paper and is set in a folded configuration and has opposite side edges respectively and adhesively bonded to the first and third liquid crystal display units at edges thereof, the first liquid crystal display unit comprising second driver device mounted thereto, the second driver device having an end positioned against the third liquid crystal display unit, the second driver device being mounted to the first liquid crystal display unit at a location close to the third liquid crystal display unit, the second driver device comprising a second servo motor, a second cam coupled to the second servo motor, and a second spring engaging the second cam, the second spring having an end distant from the second cam and positioned against the third liquid crystal display unit, the first liquid crystal display unit comprising a first outer frame, the second liquid crystal display unit comprising a second outer frame, the third liquid crystal display unit comprising a third outer frame, the first, second, and third outer frames being integrally formed together and rotatable about connected edges therebetween.

13. The jointed curved liquid crystal display device as claimed in claim 12, wherein the first liquid crystal display unit comprises a pair of first lugs, each of the first lugs comprising a first hole formed therein, the second liquid crystal display unit comprising a pair of second lugs corresponding to the first lugs respectively, each of the second lugs comprising a second hole formed therein, the first lugs being arranged to respectively mate and abut the second lugs, the first and second holes of the mated first and second lugs being in alignment with each other, a first rotation axle being received in the aligned first and second holes so that the second liquid crystal display unit is rotatable about the first rotation axle with respect to the first liquid crystal display unit.

14. The jointed curved liquid crystal display device as claimed in claim 12, wherein the third liquid crystal display unit comprises a pair of third lugs, each of the third lugs comprising a third hole formed therein, the first liquid crystal display unit further comprising a pair of fourth lugs corresponding to the third lugs respectively each of the fourth lugs comprising a fourth hole formed therein, the third lugs being arranged to respectively mate and abut the fourth lugs, the third and fourth holes of the mated third and fourth lugs being in alignment with each other, a second rotation axle being received in the aligned third and fourth holes so that the third liquid crystal display unit is rotatable about the second rotation axle with respect to the first liquid crystal display unit.

15. The jointed curved liquid crystal display device as claimed in claim 12, wherein the first cushion section is made of synthetic paper and is set in a folded configuration; and the first cushion section has opposite sides respectively and adhesively bonded to the first and second liquid crystal display units at edges thereof.

16. The jointed curved liquid crystal display device as claimed in claim 12, wherein the first liquid crystal display unit comprises a first driver device mounted thereto, the first driver device having an end positioned against the second liquid crystal display unit; and wherein the first driver device is mounted to the first liquid crystal display unit at a location close to the second liquid crystal display unit, the first driver device comprising a first servo motor, a first cam coupled to the first servo motor, and a first spring first spring having an end distant from the first cam and positioned against the second liquid crystal display unit.

* * * * *